United States Patent Office 3,376,284
Patented Apr. 2, 1968

3,376,284
N-SUBSTITUTED CYCLOPENTAQUINOXALINES
Gerhard R. Wendt, Havertown, and Kurt W. Ledig, Philadelphia, Pa., assignors to American Home Products Corporation, New York, N.Y., a corporation of Delaware
No Drawing. Filed Aug. 24, 1966, Ser. No. 574,804
4 Claims. (Cl. 260—211.5)

This invention relates to N-substituted cyclopentanequinoxalines having useful pharmacological action, and their method of preparation.

The compounds of the invention fall within the general formula:

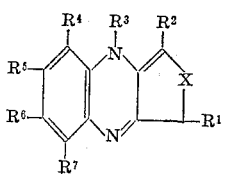

in which $R^1$ represents hydrogen or carb(lower)alkoxy, $R^2$ represents hydrogen, lower alkyl, carb(lower)alkoxy, phenyl or substituted phenyl in which there may be o, m or p substituents on the phenyl ring, the substituents being nitro, lower alkyl, lower alkoxy or halogen; $R^3$ represents a lower alkyl or hydroxyalkyl radical, the latter having from 1 to 5 hydroxy groups, $R^4$, $R^5$, $R^6$ and $R^7$ representing hydrogen or lower alkyl with $R^5$ and $R^6$ in addition standing for halogen, but preferably chlorine. The designation

is intended to represent either

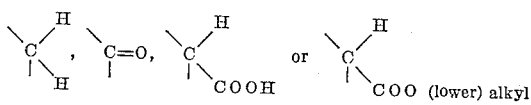

The term "lower alkyl" or "lower alkoxy" is intended to mean radicals having 1 to 6 carbon atoms, either straight chain or branched.

Compounds falling with the scope of the above-indicated formula have been found to possess anti-inflammatory activity when tested under standard pharmacological procedures and are, therefore, of use in experimental pharmacology. The activity is demonstrated when the compounds are administered at a daily dosage range of about 5 to about 100 mg. per kilogram, given either orally or parenterally.

When so administered, the active element may be combined with an inactive diluent or inert carrier. These may be either the solids or liquids normally used in compounding pharmaceuticals. Additionally, the quinoxalines may be combined with other active ingredients to supplement or enhance the activity. As an example, they may be combined with known salicylates useful in treating inflammatory conditions.

In accordance with the invention, the compounds are prepared by reacting known 2-amino-N-substituted anilines with selected cyclopentane ketones in the presence of acetic acid, a mixture of acetic and hydrochloric acid, or a mixture of acetic acid and a salt thereof. When using acetic acid, or any acid approximating the acid strength of acetic, the reaction will proceed under refluxing conditions. If one uses a mixture of acetic and hydrochloric acids, or acetic acid with sodium acetate, a solvent, preferably a lower alcohol, is utilized and the mixture is mildly heated either at refluxing or steam bath temperatures. If the starting compounds are not commercially available, they may be prepared by known procedures.

The reaction, broadly described above, may be illustrated in more detail by the following reaction scheme:

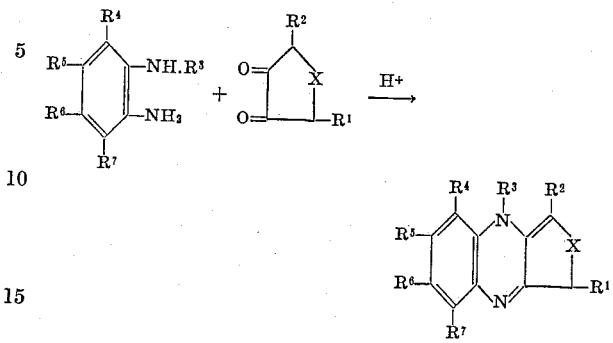

In the illustrative reaction, the radicals $R^1$ to $R^7$ and the designation X have the meanings previously assigned.

The following examples will illustrate the invention in greater detail.

Example 1.—3-butyl-1,4-dihydro-4-methyl-2H-cyclopenta[b]quinoxalin-2-one

A suspension of 3.5 g. of 3-butyl-1,2,4-cyclopentanetrione, 3.9 g. of N-methyl-o-phenylenediamine dihydrochloride, and 50 ml. of acetic acid was refluxed for 45 minutes. The reaction mixture was evaporated to dryness and the resulting brown residue was crystallized from alcohol to obtain the title compound; M.P. 174–178° C.
Found: C, 75.73; H, 6.89; N, 10.92. $C_{16}H_{18}N_2O$ requires: C, 75.56; H, 7.13; N, 11.02%.

Example 2.—3-butyl-1,4-dihydro-4-propyl-2H-cyclopenta[b]quinoxalin-2-one

Following the procedure of Example 1, react 3.5 g. of 3-butyl-1,2,4-cyclopentane-trione with 4.6 g. of N-propyl-o-phenylenediamine dihydrochloride in 50 ml. of acetic acid to obtain the title compound.

Example 3.—1,4-dihydro-4-(2-hydroxyethyl)-2H-cyclopenta[b]quinoxaline-3-carboxylic acid, ethyl ester Operating as disclosed in Example 1, react 3.77 g. of 2-amino-N-(2-hydroxyethyl)-aniline monohydrochloride in 50 ml. of acetic acid with 3.5 g. of 2,3-dioxo-1-cyclopentane carboxylic acid, ethyl ester to obtain the title compound.

Example 4.—1,4-dihydro-4-methyl-2H-cyclopenta[b]quinoxaline-1,2,3-tricarboxylic acid, triethyl ester A solution of 7.8 g. (0.04M) of N-methyl-o-phenylenediamine dihydrochloride in 50 ml. of water was treated with 3.3 g. (0.04M) of sodium acetate and was warmed on steam bath with a solution of 10.9 g. (0.04M) of 4,5-dioxo-1,2,3-cyclopentane-tricarboxylic acid, triethyl ester in 100 ml. of 50% v./v. aqueous ethanol (pH 1.5–2.0). The resulting yellow precipitate was filtered and recrystallized from N,N-dimethylformamide, yielding 7.4 g. (46%) of the desired compound.

M.P. 196–199° C., $\lambda_{max.}^{KBr}$ 5.80, 6.00 and 6.18$\mu$

Found: C, 62.74; H, 5.74; N, 7.18%. $C_{21}H_{24}N_2O_6$ requires: C, 62.99; H, 6.04; N, 7.00%.

Example 5.—1,4-dihydro-4-methyl-2H-cyclopenta[b]quinoxaline-2-carboxylic acid

Following the procedure of preceding Example 4, treat a solution of 7.8 g. of N-methyl-o-phenylene diamine dihydrochloride in 50 ml. of water with 3.3 g. of sodium acetate and heat on a steam bath with a solution of 5.7 g. of 3,4-dioxo-1-cyclopentane carboxylic acid in 100 ml. of aqueous ethanol to obtain the title compound.

Example 6.—1,4-dihydro-6,7-dimethyl-3-propyl-4-(D-ribityl)-2H-cyclopenta[b]quinoxaline-2-one A warm solution of 2.0 g. (6.5 mmoles) of 2-amino-4,5-dimethyl-N-(D-ribityl)-aniline monohydrochloride in 10 ml. of methanol was refluxed with 1.02 g. (6.6 mmoles) of 3-propyl-1,2,4-cyclopentanetrione in 10 ml. of alcohol and 1.07 g. (13.0 mmoles) of sodium acetate for a few minutes. The resulting precipitate was filtered, washed with ether, and recrystallized from aqueous ethanol (80%), yielding 300 mg. (12.0%) of the title compound M.P. 257–259° (dec.), $\lambda_{max}^{KBr}$ 3.10 and 6.10μ

Found: C, 64.77; H, 7.28; N, 7.2%. $C_{21}H_{28}N_2O_5$ requires: C, 64.93; H, 7.27; N, 7.20%.

Example 7.—6,7-dichloro-1,4-dihydro-3-propyl-4-(D-sorbityl)-2H-cyclopenta[b]quinoxalin-2-one Operating as disclosed in Example 6, reflux a solution of 2.45 g. of 2-amino-4,5-dichloro-N-(D-sorbityl)-aniline monohydrochloride in 10 ml. of methanol with 1.02 g. of 3-propyl-1,2,4-cyclopentanetrione in 10 ml. of alcohol and 1.07 g. of sodium acetate to obtain the title compound in the manner described.

Example 8.—4-(L-arabityl)-6,7-dichloro-1,4-dihydro-2H-cyclopenta[b]quinoxaline-3-carboxylic acid, ethyl ester Substitute both 2-amino-4,5-dimethyl-N-(D-ribityl)aniline and the 3-propyl-1,2,4-cyclopentanetrione by 2.25 g. of 2-amino-4,5-dichloro-N-(L-arabityl)-aniline monohydrochloride and 1.12 g. of 2,3-dioxo-1-cyclopentane carboxylic acid, ethyl ester, respectively and otherwise proceed as described in Example 6 to obtain the title compound.

Example 9.—6,7-dichloro-1,4-dihydro-3-phenyl-4-(D-sorbityl)-2H-cyclopenta[b]quinoxalin-2-one Following the procedure of Example 6, but replacing the hydrochloride salt with 2.45 g. of 2-amino-4,5-dichloro - N - (D-sorbityl)-aniline monohydrochloride and substituting 1.24 g. of 3-phenyl-1,2,4-cyclopentanetrione for the cyclopentanetrione used there, the title product will be obtained.

Example 10.—6-ethyl-1,4-dihydro-3-propyl-4-(D-ribityl)-2H-cyclopenta[b]-quinoxalin-2-one Instead of the dimethyl aniline monohydrochloride compound of Example 6, use 2.0 g. of 2-amino-5-ethyl-N-(D-ribityl)aniline monohydrochloride and proceed as further disclosed therein to prepare the compound.

Example 11.—4-(L-arabityl)-1,4-dihydro-5,7-dimethyl-3-propyl-2H-cyclopenta[b]quinoxalin-2-one Following the procedure of Example 6, but using 2.0 g. of 2-amino-4,6-dimethyl-N-(L-arabityl)-aniline monohydrochloride and 1.02 g. of 3-propyl-1,2,4-cyclopentanetrione instead of the corresponding aniline therein mentioned, one obtains the title compound.

Example 12.—3-ethyl-1,4-dihydro-6,8-dimethyl-4-(D-ribityl)-2H-cyclopenta[b]quinoxalin-2-one Replacing the reactants of Example 6 with 2.0 g. of 2 - amino-3,5-dimethyl-N-(D-ribityl)-aniline monohydrochloride and 0.93 g. of 3-ethyl-1,2,4-cyclopentanetrione and following the procedure therein disclosed, the title compound could be obtained.

We claim:
1. A compound of the formula:

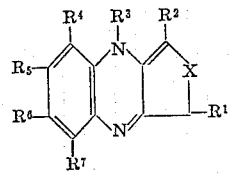

in which $R^1$ is selected from the group consisting of hydrogen and carb(lower)alkoxy, $R^2$ is a member of the group consisting of hydrogen, lower alkyl, phenyl and carb(lower)alkoxy, $R^3$ is a member of the group consisting of lower alkyl and hydroxy(lower)alkyl, and $R^4$, $R^5$, $R^6$ and $R^7$ each represent a member of the group consisting of hydrogen and lower alkyl, with $R^5$ and $R^6$ also representing chlorine, while $$\diagdown_{X}^{\phantom{X}}$$

stands for a member of the group consisting of

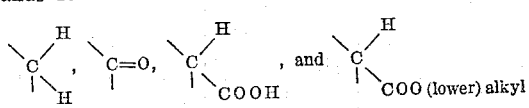

2. As a compound within the scope of claim 1; 3-butyl-1,4-dihydro-4-methyl-2H-cyclopenta[b]quinoxalin-2-one.

3. As a compound within the scope of claim 1; 1,4-dihydro - 4 - methyl-2H-cyclopenta[b]quinoxaline-1,2,3-tricarboxylic acid, triethyl ester.

4. As a compound within the scope of claim 1; 1,4-dihydro - 6,7 - dimethyl-3-propyl-4-(D-ribityl)-2H-cyclopenta[b]quinoxalin-2-one.

References Cited

UNITED STATES PATENTS 3,299,064    1/1967    Wendt et al. _____ 260—250

LEWIS GOTTS, Primary Examiner.

J. R. BROWN, Assistant Examiner.